United States Patent Office 2,905,036
Patented Sept. 22, 1959

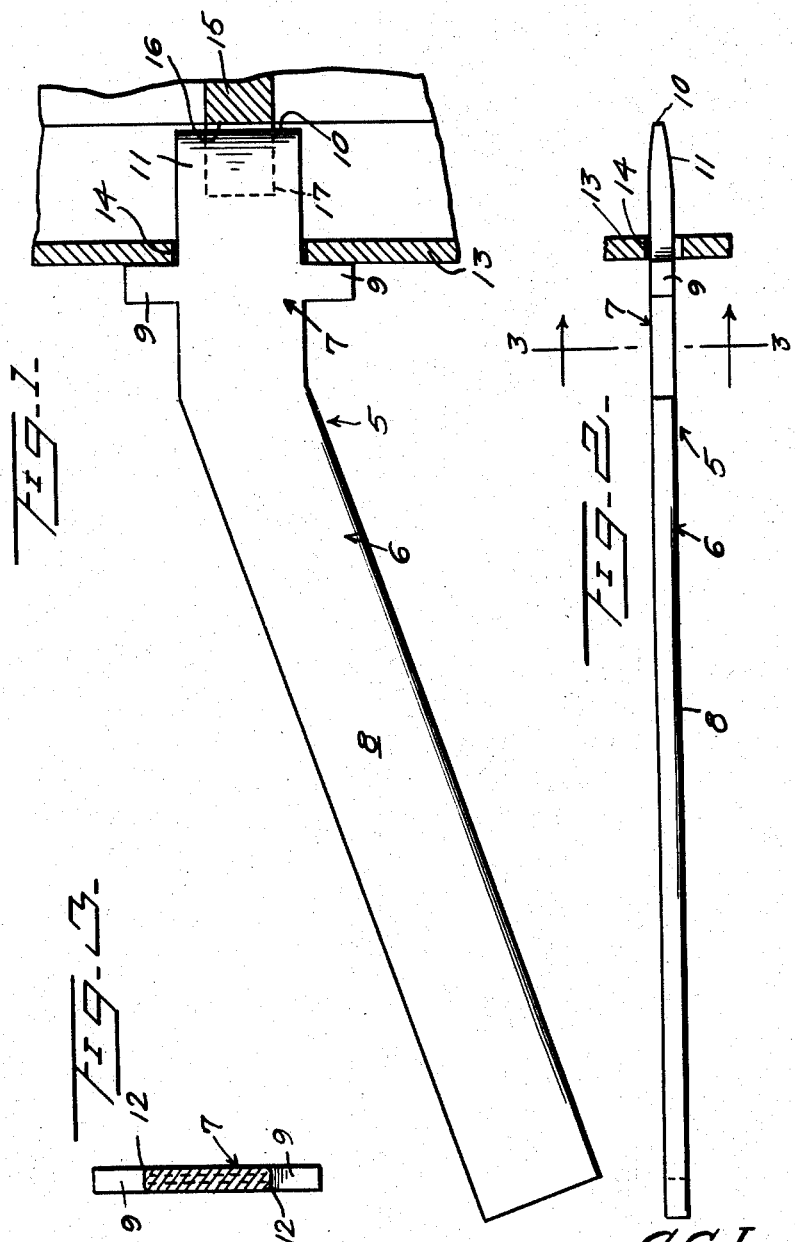

2,905,036

BRAKE ADJUSTING TOOL

Clifford C. Ledford, Zachary, La.

Application April 18, 1958, Serial No. 729,286

2 Claims. (Cl. 81—90)

This invention relates to a novel brake adjusting tool of extremely simple construction for adjusting the hydraulic wheel brakes of many models of automobiles and of certain trucks, and has for its primary object to provide a tool of extremely simple construction which may be efficiently operated for accurately adjusting hydraulic vehicle wheel brakes without risk of the tool slipping while accomplishing an adjustment and without danger of the tool moving an adjusting cog or wheel beyond a predetermined extent, so that accurate brake adjustments may be accomplished.

Another object of the invention is to provide a brake adjusting tool which is so constructed that adequate clearance will be provided for operation of the tool between a backing plate of a wheel brake and an adjacent leaf spring of the vehicle.

Various other objects and advantages of the invention will hereinafter become more fully apparent from the following description of the drawing, illustrating a presently preferred embodiment thereof, and wherein:

Figure 1 is a side elevational view of the tool shown in an applied position;

Figure 2 is a plan view thereof, looking downwardly on the upper edge of the tool as shown in Figure 1, and Figure 3 is a cross sectional view of the tool taken substantially along a plane as indicated by the line 3—3 of Figure 2.

Referring more specifically to the drawing, the vehicle wheel brake adjusting tool in its entirety and comprising the invention is designated generally 5 and comprises a relatively wide bar, designated generally 6, preferably formed of tool steel and including a short end 7 and a long end 8. Said bar ends 7 and 8 are disposed coplanar but the longitudinal edges thereof are angularly disposed relatively to one another so that the bar ends are disposed at angles to one another as illustrated in Figure 1. This angle may vary but the inner longitudinal edges of the bar ends 7 and 8 are preferably disposed at an angle of greater than 145° but less than 180°. The bar portion 7, at a point spaced a distance of approximately one inch from its distal end 10 is provided with integral outwardly projecting aligned studs 9, which preferably form integral projections of the longitudinal edges of the bar portion 7 and which combine to form a gauge or stop. The bar portion 7 is beveled on the opposite sides thereof adjacent its distal end 10 to provide a bit portion 11 which is outwardly tapered. Said bar portion 7 is preferably about two inches in length and the bar portion 8 is preferably about seven inches in length. The edges of the bar 6, or at least the handle portion 8 thereof, are slightly rounded as indicated at 12 in Figure 3.

The tool 5 is employed for adjusting the brakes of most late model automobiles, including those manufactured by General Motors and the Ford Motor Company, as well as many late model trucks. Such brakes include a backing plate flange, a portion of which is illustrated in Figures 1 and 2 and designated 13. The flange 13 is provided with a wheel brake adjusting opening 14 of a width greater than the thickness of the bar 6 and of a length slightly greater than the width of said bar, as illustrated in Figures 2 and 1, respectively.

The bit 11 is inserted inwardly through the brake adjusting opening 14 so as to engage between teeth of a conventional brake adjusting cog or toothed wheel 15, which is disposed adjacent the opening 14 and on the inner side of the flange 13, as seen in Figure 1. The bit 11 is of a length such that when the stop 9 is abutting the outer side of the flange 13, the distal end 10 of said bit will extend to adjacent the inner end of a notch 16 of the cog wheel 15, formed between two of the cog wheel teeth 17. The opening 14 is of a width sufficiently greater than the thickness of the bit 11, as illustrated in Figure 2, so that the tool bit 11 can be rocked in the opening 14 for turning the cog 15 in a direction to effect a tightening of the brakes. Rotation of the cog 15 in one direction increases the distance between the brake shoes and thus locates the brake shoes closer to the brake drum. The stop 9 limits the extent that the bit 11 can be inserted through the opening 14 and so as to properly position the tapered end of the bit 11 between two of the teeth 17 and in the notch 16. The stop 9 also limits the extent that the cog or toothed wheel 15 can be turned by the tool 5 without disengaging the bit 11 from one notch or recess 16 of the cog 15 and engaging it with another notch or recess. The length of the opening 14 is only slightly greater than the width of the bit 11, as seen in Figure 1, so that the bit cannot be moved laterally of the plane of the cog 15 and thereby disengaged from the notch 16. Thus, the possibility of the tool slipping laterally out of engagement with the cog 15 is eliminated.

The tool 5 is of sufficient width and thickness to readily withstand any stresses to which it may be subjected in use, and is of a length to enable it to be accommodated between the flange 13 and an adjacent vehicle spring, not shown, so that operation of the tool 5 will not be hampered or impeded by the spring.

Various modifications and changes are contemplated and may be resorted to, without departing from the function or scope of the invention as hereinafter defined by the appended claims.

I claim as my invention:

1. A vehicle wheel brake adjusting tool comprising an elongated bar having gauge means adjacent one end thereof, said bar having a bit portion extending from said gauge means to the bar end located adjacent thereto, said bit portion of the bar being beveled on opposite sides thereof toward said end of the bar to form a tapered bit edge adapted to engage between teeth of a hydraulic wheel brake adjusting cog or toothed wheel, said bit portion being of a width and thickness less than the length and width, respectively, of a backing plate flange brake adjusting opening of the wheel brake and being adapted to extend inwardly through said opening, and said gauge means constituting a lateral extension of at least one longitudinal edge of the bar and defining a tool part of a width greater than the length of the opening and adapted to abut against a portion of the wheel brake flange to limit the extent of inward movement of the bit portion toward the brake adjusting cog and the extent that the cog can be turned at each operation of the brake adjusting tool.

2. A vehicle wheel brake adjusting tool comprising an elongated bar having gauge means adjacent one end thereof, said bar having a bit portion extending from said gauge means to the bar end located adjacent thereto, said bit portion of the bar being beveled on opposite sides thereof toward said end of the bar to form a tapered bit edge adapted to engage between teeth of a hydraulic wheel brake adjusting cog or toothed wheel, said bit portion being of a width and thickness less than the length and width, respectively, of a backing plate flange brake adjusting opening of the wheel brake and being adapted to extend inwardly through said opening, said gauge means comprising aligned studs projecting outwardly from both longitudinal edges of the bar and being adapted to engage an outer side of the backing plate flange beyond the ends of the brake adjusting opening thereof to limit inward movement of the bit portion toward the brake adjusting cog and the extent that the cog can be turned at each operation of the brake adjusting tool.

References Cited in the file of this patent

UNITED STATES PATENTS

| | | |
|---|---|---|
| 1,584,422 | Bate | May 11, 1926 |
| 2,320,679 | Taylor | June 1, 1943 |

FOREIGN PATENTS

| | | |
|---|---|---|
| 51,421 | Denmark | Mar. 10, 1936 |

OTHER REFERENCES

Cornwell Catalog No. 23, page 39, copyright 1946.